US011453830B2

(12) United States Patent
Wegner et al.

(10) Patent No.: US 11,453,830 B2
(45) Date of Patent: Sep. 27, 2022

(54) REACTOR AND PROCESS FOR GASIFYING AND/OR MELTING OF FEED MATERIALS

(71) Applicant: African Rainbow Minerals Limited, Johannesburg (ZA)

(72) Inventors: André Wegner, Sussex (GB); Petrus Hendrik Ferreira Bouwer, Johannesburg (ZA)

(73) Assignee: African Rainbow Minerals Limited, Johannesburg (ZA)

( * ) Notice: Subject to any disclaimer, the term of this patent is extended or adjusted under 35 U.S.C. 154(b) by 6 days.

(21) Appl. No.: 17/297,751

(22) PCT Filed: Nov. 28, 2019

(86) PCT No.: PCT/IB2019/060279
§ 371 (c)(1),
(2) Date: May 27, 2021

(87) PCT Pub. No.: WO2020/110061
PCT Pub. Date: Jun. 4, 2020

(65) Prior Publication Data
US 2022/0049169 A1    Feb. 17, 2022

(30) Foreign Application Priority Data
Nov. 28, 2018   (ZA) .................................. 2018/08023

(51) Int. Cl.
*C10J 3/08*      (2006.01)
*B01J 6/00*      (2006.01)
(Continued)

(52) U.S. Cl.
CPC ................. *C10J 3/08* (2013.01); *B01J 6/008* (2013.01); *C10B 53/00* (2013.01); *C10J 3/26* (2013.01);
(Continued)

(58) Field of Classification Search
CPC ........ C10J 3/66; C10J 2300/1634; C10J 3/08; C10J 3/26; C10J 2200/09; C10J 53/00; C10J 2200/156; B01J 6/008
See application file for complete search history.

(56) References Cited

U.S. PATENT DOCUMENTS 4,323,446 A * 4/1982 Chervenak ............... C10J 3/721
                                                      208/414
4,530,702 A * 7/1985 Fetters ...................... C10J 3/74
                                                       48/209
(Continued)

FOREIGN PATENT DOCUMENTS

CA    2642590 A1    8/2007
DE    4030554 A1    4/1992
(Continued)

OTHER PUBLICATIONS

WIPO Application No. PCT/IB2019/060279, PCT International Search Report and Written Opinion of the International Searching Authority dated Feb. 3, 2020.
(Continued)

*Primary Examiner* — Imran Akram
(74) *Attorney, Agent, or Firm* — Schwabe, Williamson & Wyatt PC

(57) ABSTRACT

This invention relates to a method and a reactor for gasifying a carbonaceous feedstock material. The method includes the steps of choke-feeding a carbonaceous feedstock material into a pyrolysis zone of the reactor to form a discharge bed; heating the discharge bed to initiate pyrolysis of the feedstock material to form a pyrolysis product; providing a lower lying upper oxidation zone; gasifying the pyrolysis product to form a bed of char; converting thermal energy into chemical energy in an upper reduction zone; providing a lower lying lower oxidation zone; collecting any metal slag and/or slag melts in the lower oxidation zone; and discharg-
(Continued)

ing hot reducing gases having a temperature of at least 1300° C. and a $CO/CO_2$ ratio of ≥5, more preferably ≥15.

11 Claims, 2 Drawing Sheets

(51) Int. Cl.
    *C10J 3/26*     (2006.01)
    *C10J 3/66*     (2006.01)
    *C10J 3/74*     (2006.01)
    *C10B 53/00*     (2006.01)

(52) U.S. Cl.
    CPC . *C10J 3/66* (2013.01); *C10J 3/74* (2013.01); *C10J 2200/152* (2013.01); *C10J 2300/0906* (2013.01); *C10J 2300/0946* (2013.01); *C10J 2300/0956* (2013.01); *C10J 2300/0959* (2013.01); *C10J 2300/1634* (2013.01); *C10J 2300/1861* (2013.01)

(56) References Cited

U.S. PATENT DOCUMENTS

| | | | | |
|---|---|---|---|---|
| 4,823,712 A | * | 4/1989 | Wormer | F23G 5/04 110/263 |
| 4,967,673 A | * | 11/1990 | Gunn | C10J 3/02 110/229 |
| 8,246,700 B1 | * | 8/2012 | Kutsin | C10J 3/463 423/644 |
| 2006/0112639 A1 | * | 6/2006 | Nick | C10K 1/005 48/198.1 |
| 2012/0036777 A1 | * | 2/2012 | Patel | C10J 3/26 48/197 R |
| 2014/0219874 A1 | * | 8/2014 | Potgieter | C10J 3/723 422/111 |
| 2014/0338262 A1 | * | 11/2014 | Schwarz | F23G 5/0276 48/89 |
| 2016/0304797 A1 | * | 10/2016 | Gaia | C10J 3/02 |
| 2018/0105758 A1 | * | 4/2018 | Cheiky | C10J 3/42 |
| 2018/0237699 A1 | * | 8/2018 | Zerkalov | C10J 3/487 |
| 2020/0032150 A1 | * | 1/2020 | Kresnyak | C10J 3/38 |

FOREIGN PATENT DOCUMENTS

| | | | | |
|---|---|---|---|---|
| DE | 19816864 A1 | | 10/1999 | |
| DE | 102013202356 A1 | * | 8/2013 | ............ C10J 3/42 |
| WO | WO-9600265 A1 | * | 1/1996 | ............ C10B 49/06 |
| WO | 02/46331 A1 | | 6/2002 | |

OTHER PUBLICATIONS

WIPO Application No. PCT/IB2019/060279, PCT International Preliminary Report on Patentability dated Sep. 23, 2020.

* cited by examiner

REACTOR AND PROCESS FOR GASIFYING AND/OR MELTING OF FEED MATERIALS

CROSS-REFERENCE TO RELATED APPLICATIONS

This Application is a US National Stage Application under 35 USC § 371 of PCT/IB2019/060279, filed Nov. 28, 2019, which claims the benefit of South African Patent Application No. 2018/08023, filed Nov. 28, 2018, each of which is herein incorporated by reference in its entirety.

FIELD OF THE INVENTION

This invention relates to a method and a reactor for gasifying and/or melting substances. In particular, the invention relates to the material and/or energy recovery of any waste, for example, but not exclusively household waste, used tires, hazardous waste, asbestos, hospital waste, coal or coal dust. The reactor and the method are also suitable for the gasifying and melting of feed materials of any composition or for the generation of energy through the use of waste and/or coal.

BACKGROUND TO THE INVENTION

For some time now, solutions have been sought for the thermal disposal of various types of waste and other materials. In addition to combustion processes, various gasification processes are known, the main aim of which is to achieve results with a low pollutant load on the environment and to reduce the cost of treating the feed materials, but also the gases produced in the process. However, the known processes are characterized by a complex technology that is difficult to master and the associated high disposal costs for the feed material or waste to be treated.

For instance, EP 1 261 827 B1 discloses a reactor for the gasifying and/or melting of feed materials. This reactor does not follow the approach of the previously frequently used circulating gas process. In contrast, the disclosed reactor operates according to the co-current principle. The complete elimination of conventional recirculation gas management avoids many of the problems associated with the condensation of pyrolysis products and the formation of unwanted deposits. Furthermore, EP 1 261 827 B1 discloses that already in the upper part of the reactor a partial conglomeration of the feed materials takes place due to the shock-like heating of the bulk material (bulk column), whereby adherences to the inner wall of the reactor are largely excluded. In EP 1 261 827 B1 it is disclosed that a reduction section is formed between two injection means through which all gases flow before extraction, thereby reducing them to a large extent.

Although the reactor disclosed in EP 1 261 827 B1 largely reduces the feed materials, the gas discharged from the reactor cannot be used without further heating for use in the metallurgical reactors for reduction melting due to the outlet temperatures from the reactor.

OBJECT OF THE INVENTION

It is accordingly an object of the present invention to provide a novel reactor for and method of gasifying and/or melting substances which overcomes, at least partially, the abovementioned disadvantages and/or which will be a useful alternative to existing reactors for and methods of gasifying and/or melting substances

SUMMARY OF THE INVENTION

According to a first aspect of the present invention, there is provided a method of gasifying a carbonaceous feedstock material to generate hot reducing gases using a reactor, the method including the steps of:
feeding a carbonaceous feedstock material via a sluice to form a discharge bed in a pyrolysis zone of the reactor;
heating the discharge bed in the pyrolysis zone to initiate pyrolysis in the carbonaceous feedstock material and to form a pyrolysis product;
providing a lower lying hot upper oxidation zone in the reactor by supplying a source of oxygen at a temperature of at least 800° C. to the reactor at a location beneath the pyrolysis zone;
gasifying the pyrolysis product and remaining un-pyrolyzed carbonaceous feedstock material, if any remains, in the hot upper oxidation zone to form a char bed in an upper reduction zone of the reactor, the upper reduction zone being located beneath the hot upper oxidation zone;
converting thermal energy into chemical energy in the upper reduction zone;
providing a lower lying hot lower oxidation zone in the reactor by supplying a source of oxygen at a temperature of at least 800° C. to the reactor at a location beneath a lower reduction zone of the reactor;
collecting any metal and/or slag melts present in the lower oxidation zone;
removing the metal and/or slag melts present in the lower oxidation zone; and
discharging hot reducing gases having a temperature of at least 1300° C. and a $CO/CO_2$ ratio of $\geq 5$ which have been generated in the upper reduction zone through a gas outlet located in a gas outlet section of the reactor, the gas outlet section being located between the upper reduction zone and the lower reduction zone of the reactor The source of oxygen may be air or pure oxygen.

The metal and/or slag melts present in the lower oxidation zone may be removed from the lower oxidation zone by tapping the metal and/or slag melts.

There is provided for the hot reducing gases which are being discharged to have a $CO/CO_2$ ratio $\geq 15$.

The method may include the additional step of providing hot gases (e.g. preheated air or combustion gases, which are supplied via burners or nozzles) to the pyrolysis zone to initiate pyrolysis in the carbonaceous feedstock material and to form the pyrolysis product.

There is provided for the heating of the discharge bed in the pyrolysis zone to be done gradually to a temperature of at least 700° C., the temperature being increased gradually to prevent breakup of the carbonaceous feedstock material and pyrolysis product. Advantageously, this prevents the formation of fine or powder carbonaceous feedstock material, pyrolysis product and char which may choke the reactor. Therefore, the method and reactor can be operated at a lower pressure than a case where fine or powder carbonaceous feedstock material, pyrolysis product and char are formed. As an example, the method and reactor can be implemented and/or operated at a pressure of 50 kPa.

The volumetric flow rate of the hot gasses may be controlled to heat the discharge bed in the pyrolysis zone gradually.

The method may include the additional step of drying the carbonaceous feedstock material prior to choke-feeding the carbonaceous feedstock material to the reactor.

The volumetric flow rate of the source of oxygen to the lower oxidation zone may be controlled to prevent the accumulation of char fines in the lower oxidation zone. To increase the consumption rate of char fines in the lower oxidation zone, the volumetric flow rate of the source of oxygen to the lower oxidation zone may be increased.

The method may, further, include the step of preheating and pre-drying the carbonaceous feedstock material in a buffer zone of the reactor, the buffer zone being located above the pyrolysis zone of the reactor.

By feeding the carbonaceous feedstock material in the pyrolysis zone, a discharge bed having a discharge cone may be formed and the cross-section of the pyrolysis zone may be enlarged with respect to the cross-section of the buffer zone.

There is provided for the method to include the additional step of pyrolyzing and drying the carbonaceous feedstock material in an intermediate zone of the reactor, the intermediate zone being located beneath the pyrolysis zone.

The method may include the still further step of discharging hot reducing gases having a temperature of at least 1300° C. which have been generated in a co-current section of the reactor from the at least one gas outlet of the reactor, the co-current section may comprise:
  a plenum zone of the reactor, the plenum zone comprising:
    the feed zone of the reactor;
    the buffer zone of the reactor;
    the pyrolysis zone of the reactor; and
    the intermediate zone of the reactor;
  the upper oxidation zone of the reactor; and
  the upper reduction zone of the reactor.

There is provided for the method to include the step of discharging hot reducing gases having a temperature of at least 1300° C. which have been generated in a countercurrent section of the reactor through the gas outlet located in the gas outlet section of the reactor, the countercurrent section may comprise the lower oxidation zone and lower reduction zone of the reactor.

The volume ratio of the upper oxidation zone volume to the plenum zone volume may be a ratio of 1:N volume units, wherein $4 \leq N \leq 20$.

The volume ratio of the upper oxidation zone volume to the total volume of the upper reduction zone and the plenum zone volume may be a ratio of 1:N volume units, wherein $7 \leq N \leq 25$.

The volume ratio of the countercurrent section volume to the total volume of the reactor may be a ratio of 1:N volume units, wherein $1 \leq N \leq 10$.

By supplying at least 800° C. hot oxygen and/or air below the intermediate zone, a hot upper oxidation zone is created having a temperature above 1800° C. in a particular area of the lining and temperatures between 2000° C. and 4000° C. in the bed. The pyrolysis products and parts of the feedstock material burn, crack and/or melt in this hot upper oxidation zone, whereupon further coking of the not yet converted feedstock material takes place. In the subsequent upper reduction zone, thermal energy is then converted into chemical energy. The conversion of chemical energy in thermal energy is partially achieved by reducing $CO_2$ to CO. Here, the $CO/CO_2$ gas volume ratio at the gas outlet may be greater than 10 or even greater than 15. For example, the $CO/CO_2$ gas volume ratio may be between 10 and 1000, 15 and 10000 and even between 15 and $10^7$ (essentially $CO_2$-free).

The gas may flow in the co-current section from the feed zone to the gas outlet in co-current.

A hot zone having temperatures between 1800° C. and 4000° C. may also be created in the conical lower oxidation zone by providing at least 1000° C. hot oxygen and/or air. Metal and/or slag melts may also be collected in this lower-arranged hot lower oxidation zone. These slag melts and/or metal melts may be tapped off via the tapping (e.g. in molds) or run out continuously (e.g. to a slag granulation) as required. In the conical lower oxidation zone and in the conical lower reduction zone, hot gases having a temperature above 1000° C. and up to 2000° C. may also be generated which flow upwards (in countercurrent) in the direction of the gas outlet. The thermal energy may also be converted into chemical energy in the lower reduction zone, in part by reducing $CO_2$ to CO. This ensures that the $CO/CO_2$ gas volume ratio is greater than 10 or even greater than 15 when the gas outlet is reached. For example, the $CO/CO_2$ gas volume ratio is between 10 and 1000, preferably between 15 and 10000 and in particular preferably between 15 and $10^7$ (essentially $CO_2$-free). The gases from the co-current section (from top to bottom) and the gases from the countercurrent section (from bottom to top) are discharged from the gas outlet section through at least one gas outlet. The gases from the co-current section and the gases from the countercurrent section have temperatures between 1500° C. and 1750° C., preferably between 1600° C. and 1750° C.

The method steps essential for the invention may be advantageously further developed by exhausting the gases produced in the co-current section and the gases produced in the countercurrent section by suction. For this purpose, gas suction means may be used. The suction may create a negative pressure in the reactor. The use of negative pressure in the reactor may allow maintenance of the reactor during operation, as air may be sucked in when the gasifier is opened, but no gas can escape.

According to a second aspect of the present invention, there is provided a reactor for use in a method of gasifying a carbonacious feedstock material, the reactor comprising:
  a co-current section comprising:
    a plenum zone comprising:
      a feed zone with a sluice, wherein feed materials are introduced into the reactor from above via the feed zone;
      a buffer zone;
      a refractory lined pyrolysis zone that adjoins the bottom of the buffer zone while providing a cross-sectional enlargement; and
      a refractory lined intermediate zone that adjoins the bottom of the pyrolysis zone;
    a refractory lined upper oxidation zone that adjoins the bottom of the intermediate zone and comprises tuyeres in at least one plane; and
    a refractory lined upper reduction zone that adjoins the bottom of the upper oxidation zone;
  a refractory lined gas outlet section comprising at least one gas outlet; and
  a refractory lined countercurrent section comprising:
    a conical lower reduction zone adjoining said gas outlet section; and
    a conical lower oxidation zone adjoining the conical lower reduction zone and comprising at least one tuyere and a tapping,
wherein the volume ratio of the refractory lined upper oxidation zone volume to the plenum zone volume is a ratio of 1:N volume units, wherein $4 \leq N \leq 20$.

The volume ratio of the refractory lined upper oxidation zone volume to the total volume of the refractory lined upper reduction zone volume and the plenum zone volume may be a ratio of 1:N volume units, wherein 7≤N≤25.

The volume ratio of the refractory lined countercurrent section volume to the total volume of the reactor may be a ratio of 1:N volume units, wherein 1≤N≤10.

There is provided for at least one refractory lined portion of the reactor to consist of at least two lining sections arranged one above the other, wherein a tongue-and-groove connection is formed between the lining sections arranged one above the other, wherein one of the lining sections has the groove on the side facing the reactor interior and the other lining section has the tongue on the side facing the reactor interior, wherein the tongue-and-groove connection has a temperature-dependent gap opening between the groove and the tongue.

A circumferential water-cooled console may be arranged between the at least two lining sections.

The upper lining section may have the groove and the lower lining section may have the tongue.

The at least two lining sections may have one refractory inner lining and an outer lining encasing the inner refractory lining.

The inner refractory lining may be a lining made of fired bricks or a monolithic lining.

The circumferential water-cooled console may consist of black or stainless steel.

The tuyeres of the refractory lined upper oxidation zone and/or refractory lined conical lower oxidation zone may consist out of ceramic.

In an alternative embodiment, the tuyeres of the refractory lined upper oxidation zone and/or refractory lined conical lower oxidation zone may consist out of copper or steel, wherein an inner ceramic pipe is arranged in each of the tuyeres, and wherein a compressible and temperature-resistant layer is arranged between the ceramic inner pipe and the respective tuyere.

The refractory lined upper oxidation zone may have a cone angle of between 5° and 30°.

The refractory lined upper reduction zone may be arranged above the refractory lined gas outlet section so that the refractory lined gas outlet section adjoins the bottom of the refractory lined upper reduction zone while providing a cross-sectional enlargement.

A portion of the refractory lined upper reduction zone may be arranged in the refractory lined gas outlet section and the refractory lined gas outlet section may have a cross-sectional enlargement with respect to the refractory lined upper reduction zone.

The refractory lined conical lower reduction zone and the refractory lined conical lower oxidation zone may have a cone angle of between 50° and 70°.

A gas supply means may be arranged in the region of the cross-sectional enlargement of the refractory lined pyrolysis zone.

The tuyeres of the refractory lined upper oxidation zone may be arranged in a plurality of planes.

There is provided for at least one further tuyere to be arranged in a further plane of the refractory lined conical lower reduction zone or one further tuyere to be arranged in a further plane of the refractory lined conical lower reduction zone and at least one additional tuyere to be arranged in the refractory lined upper reduction zone.

At least one further tuyere may be arranged in a further plane of the refractory lined conical lower oxidation zone.

In order that hot gases with temperatures greater than 1500° C., for example between 1600° C. and 1750° C., can be discharged from the gas outlet, it is provided that the reactor is designed in such a way that temperatures above 1800° C. in the peripheral area of the bulk material (or the bed) and between 2000° C. and 4000° C. in the center of the bulk material (or the bed) can be reached at least in the refractory lined upper oxidation zone. These high temperatures cause the refractory lining (e.g. brick lining) to expand axially, tangentially and radially up to 20 mm per lining meter, creating stresses in the lining which in turn affect the outer steel shell of the reactor in a radial direction.

In order that the stability of the reactor is not impaired by these high temperatures and the resulting stresses in the lining, it is provided in accordance with the invention, that at least one refractory lined portion of the reactor consists of at least two lining sections arranged one above the other. The at least one refractory lined portion can be the refractory lined pyrolysis zone, the refractory lined buffer zone, the refractory lined upper oxidation zone, the refractory lined upper reduction zone, the refractory lined gas outlet section, the refractory lined countercurrent section, or a combination thereof.

Here it can be conceived that the refractory lining of the reactor has a further lining section every 2 to 4 height meters.

For reactors which have a gas outlet temperature of 1500° C. to 1600° C., it may be provided that the refractory lining has a further lining section every 3 to 4 height meters. For reactors which have a gas outlet temperature of 1600° C. and 1750° C., it may be provided that the refractory lining has an additional lining section every 2 to 3 height meters.

Since particularly high temperatures (temperatures between 1800° C. and 4000° C.) are generated in the lined upper oxidation zone and the lined lower oxidation zone, it may be provided that the lining sections arranged one above the other are arranged in such a way that exactly one lining section is arranged in each of the lined upper oxidation zone and the lined lower oxidation zone. Furthermore, it may be provided that a further lining section is arranged below and above the oxidation zones. This ensures that the hot oxidation zones each are composed of only one lining section, wherein each of the lining sections can expand in the direction of the respective further lining section, such that in these zones there is no need for further consoles or other fixations, which can be damaged at these high temperatures.

In order that no hot gases or high temperatures continue to escape outside via the region between the at least two lining sections, it is also be provided that a tongue-and-groove connection is formed between the refractory lining sections arranged one above the other, wherein one of the refractory lining sections has the groove on the side facing the reactor interior and the other lining section has the tongue on the side facing the reactor interior. The tongue-and-groove connection is designed in such a way that even when the reactor is at a standstill, the tongue in the groove is arranged in a positive-locking manner, whereby the vertical outer wall of the tongue is connected to the vertical wall of the groove, but a vertical gap opening remains between the groove and the tongue. This is an advantage in ensuring that despite the gap opening no gas can escape during start-up or high heating of the reactor. Furthermore, it may be provided that the gap opening between the groove and the tongue is a temperature-dependent gap opening. The temperature-dependent gap opening between the groove and the tongue can be for example 50 mm. As described above, the lining can expand at high temperatures, where the tongue can expand into the groove due to the tongue-and-groove connection.

Furthermore, it is provided that a circumferential water-cooled console for holding the refractory lining and stabilizing the lining during heating up and cooling down of the reactor is arranged between the at least two lining sections arranged one above the other. This circumferential water-cooled console can be produced by bending of hollow cylindrical pipes with square or rectangular cross-sections without welding seams. It can be advantageously provided here that the water-cooled console has a high heat flow, which is achieved by flow velocities of the cooling water from 2 m/s to 25 m/s, which is supplied via a connection flanges. These high flow velocities of the cooling water are advantageous for maintaining the thermal and mechanical stability of the circumferential console when it is arranged in areas with high temperatures (>1500° C.).

The arrangement described above of at least two superimposed tongue-and-groove refractory lining sections and a circumferential water-cooled console may be arranged in the co-current section and/or the gas outlet section and/or the countercurrent section. Each section can also have several arrangements of two refractory lining sections arranged one above the other with tongue-and-groove connection and circumferential water-cooled console.

The co-current section of the reactor according to the invention comprises a partially lined plenum zone, a lined upper oxidation zone, and a lined upper reduction zone.

The partially lined plenum zone comprises a feed zone with at least one sluice, a buffer zone, a lined pyrolysis zone, and a lined intermediate zone.

Via the feed zone with a sluice, feed materials such as waste, toxic or biological waste, water, used tires, biomass, wood, coal, automotive shredder residues, aggregates or the like can be fed into the reactor from above. The sluice ensures that the uncontrolled entry of ambient air and the discharge of gases from the reactor are avoided as far as possible. It is intended that the sluices may have hydraulic, pneumatic or electrically operated hatches. These hatches can preferably be designed in such a way that the hatches are additionally closed in the event of unintentional overpressure in the reactor and no gas can escape unintentionally.

The plenum zone also includes a buffer zone for buffering and pre-drying the feed material volume. The temperature of the buffer zone is preferably adjustable. For example, a set temperature of approx. 100° C. to 200° C. can be provided for the pre-drying of waste.

In addition, a refractory lined pyrolysis zone is provided in the plenum zone, which is connected to the bottom of the buffer zone by creating a cross-sectional enlargement being preferably abrupt. Preferably, the cross-section increases at least twice. The cross-sectional enlargement ensures that the sinking speed of the feed materials is reduced and that a cone-shaped discharge area (discharge cone) made of bulk material forms within the gas space of the reactor. The discharge cone is supplied centrally with the pre-dried feed materials (from the buffer zone).

Hot gases (e.g. combustion gases, temporarily stored or recirculated excess gases, or inert combustion gases provided by combustion) can be supplied to the discharge cone in the refractory lined pyrolysis zone via burners, nozzles, wall openings or other devices. The bed is shock-heated by the hot gases at the surface, whereby sticking of the feed materials with the lining (e.g. brick lining or castable lining) is prevented as far as possible. Shock heating can be achieved, for example, by means of burners directed radially at the bed. Alternatively, or additionally, shock heating can also be achieved by means of a ring-shaped channel in which a flame rotates. This rotation can be achieved constructively by blowing the hot gas tangentially to the discharge cone and burning it.

The plenum zone also includes a refractory lined intermediate zone located below and adjacent to the refractory lined pyrolysis zone. In the intermediate zone, the heat from the pyrolysis zone and the waste heat from the refractory lined upper oxidation zone below are used for final drying and complete pyrolysis of the feed materials. It may be advantageously provided that the intermediate zone comprises a lined (e.g. brick lined or castable lined) steel shell, wherein the liner can be of a thickness similar to that of other zones. This embodiment simplifies the commissioning (starting up) of the reactor, as high temperatures can also occur in the intermediate zone. It may be advantageous to provide for a tapered cross-section in the lower area of the intermediate zone, which changes the rate at which the feed material sinks.

Below the refractory lined intermediate zone in the zonally refractory lined co-current section there is a lined upper oxidation zone in which tuyeres are arranged. These tuyeres are arranged on at least one level (height or vertical distance from the reactor bottom). Since the reactor, as described above, has a circumferential water-cooled console and two lining sections arranged one above the other and having tongue-and-groove connection, the temperature in the upper oxidation zone in the region of refractory lining can be increased to more than 1800° C. and the temperature in a center of bulk material (bed) can be increased to a value in between of 2000° C. and 4000° C. by providing at least 1000° C. hot oxygen and/or air without compromising the stability of the reactor.

All materials can be converted in an inorganic gas such as carbon monoxide (CO), hydrogen ($H_2$), water ($H_2O$), carbon dioxide ($CO_2$), hydrogen sulphide ($H_2S$), ammonia ($NH_3$), nitrogen dioxide ($NO_2$) or sulphur dioxide ($SO_2$), liquid metal or liquid slag, coke or carbon (C) by these hot temperatures.

Below the upper oxidation zone, a lined upper reduction zone is arranged in the lined co-current section, into which essentially no organic components enter.

It can be advantageously provided that the lined upper reduction zone has a cross-sectional enlargement compared to the upper oxidation zone, which changes the sinking rate of the feed materials and increases the residence time at the same level. In the lined upper reduction zone, the gas flows through the coked fixed bed in co-current and thermal energy is converted into chemical energy, producing carbon monoxide (CO) and hydrogen ($H_2$). In particular, carbon dioxide ($CO_2$) is converted into carbon monoxide (CO) and water ($H_2O$) into hydrogen ($H_2$), whereby the carbon still contained in the bed is further gasified. Reduction of $CO_2$ to CO can be achieved in the reactor in such a way that the $CO/CO_2$ gas volume ratio is greater than 10 or even greater than 15. For example, the $CO/CO_2$ gas volume ratio is between 10 and 1000, preferably between 15 and 10000 and in particular preferably between 15 and $10^7$ (essentially $CO_2$-free).

As they pass through the upper reduction zone, the gases are simultaneously cooled, for example to temperatures between approx. 1000° C. and approx. 1600° C. As all material flows necessarily flow through the upper oxidation zone and cannot be returned, there is no longer any contact with the unreacted materials above the oxidation zone after they have passed through the upper reduction zone. In this way, all cleanly cracked and/or melted, exclusively inorganic substances reach the gas outlet section without anew contamination.

As all material flows necessarily flow through the upper oxidation zone and cannot be returned, there is no longer any contact with the unreacted materials above the oxidation zone after they have passed through the upper reduction zone. In this way, all cleanly cracked and/or melted, exclusively inorganic substances reach the gas outlet section without anew contamination in the lined gas outlet section. The gases of the upper oxidation zone are cooled as they pass through the lined upper reduction zone. It can be provided that the gases produced in the lined upper oxidation zone are so hot that passing through the upper reduction zone leads to a cooling to a temperature between 1500° C. and 1750° C., wherein after the cooling these hot gases reach the gas outlet.

It is provided that the gas outlet section comprises at least one gas outlet. It is also conceivable that several (e.g. four) gas outlets are arranged all-round, preferably radial distributed.

Below the lined gas outlet section there is a substantially conical lined countercurrent section. This comprises a conical lower reduction zone to convert the thermal energy of the gas from the conical lower oxidation zone into chemical energy (mainly CO) and to generate the countercurrent. This conical lower reduction zone is connected to the lined gas outlet section. Below the conical lower reduction zone, a conical lower oxidation zone is arranged with the cut tip of the cone pointing downwards. In the conical lower oxidation zone, the residual coked material is converted into gas. In the conical lower oxidation zone at least one tuyere is arranged in at least one plane, via which at least 1000° C. hot air and/or oxygen can be introduced, which in turn cause temperatures between 1800° C. and 4000° C. in the bed of the lower oxidation zone. These high temperatures allow the slag and the metals to leak out in liquid form via at least one tapping for collection and discharge.

The generated gas flows in countercurrent through the conical lower reduction zone to the gas outlet section, where the gases cool to temperatures between approx. 1500° C. and approx. 1750° C. Here it can be provided, that the gases generated in the lower oxidation zone are so hot that passing through the lower reduction zone leads to cooling of the gases to a temperature between 1500° C. and 1750° C. or between 1600° C. and 1750°, which are then discharged through the gas outlet reduction zone.

Since according to the invention, the reactor has both a reduction zone in the countercurrent section and an upper reduction zone in the co-current section, the total reduction zone volume (sum of the volumes of the upper and conical lower reduction zones) can be considerably larger than the one reduction zone of known reactors. As an example, reference is made to EP 1 261 827 B1, in which only a reduction zone is arranged in the area of the gas outlet section.

Thus, according to the invention, the reactor achieves a simple, inexpensive and environmentally friendly material and/or energetic utilization of feed materials. In addition, employing of the reactor described herein enables increase in capacity and yield of a chemical and a thermal energy.

It is provided in one embodiment of the reactor that the upper lining section has the groove and the lower lining section has the tongue.

This can cause the lining to expand upwards when exposed to hot temperatures.

A further embodiment of the reactor provides, that each of the at least two lining sections comprises at least one refractory inner lining and an outer lining encasing the refractory inner lining, wherein the refractory inner lining is a brick lining made of fired bricks or a monolithic (e.g. castable) lining.

Furthermore, it may be provided that the lining sections, comprising a refractory inner lining and an outer lining, are arranged in a stabilizing steel shell.

It may also be advantageous that at least one further insulating layer is arranged between the outer lining and the steel shell. The additional insulating layer may consist of cardboard, high-temperature felt, or high-temperature foams.

This embodiment ensures that the steel shell is better insulated. For example, the additional insulating layer can be designed in such a way, that thermal heat loss through the steel shell is improved by more than 2% compared to reactors without an additional insulating layer and as a result thereof the outside temperature of the steel shell is also reduced. For example, this design allows the outside temperature of the steel shell to remain below 60° C. during reactor operation, which means that no contact protection is required. Furthermore, the insulating layer can be used to compensate a possible radial thermal expansion of the inner lining and/or the outer lining.

In order to reduce the wear of the refractory inner lining, it may also be provided that the inner lining consists of bricks consisting of spinel corundum, chromium corundum, or carbides. It can be provided that the thermal conductivity of these stones is >3 W/mK.

Furthermore, it may be provided that the bricks in the hotter areas (temperatures>1500° C.) of the reactor are protected against chemical and/or thermal conditions by slag freezing.

In order to enable this slag freezing, the outer lining can consist of thermally conductive materials, whereby sufficient heat transfer of the cooling medium (e.g. a pipe coil with cooling water) to the inner lining can be achieved.

Here it is conceivable that the outer lining is formed from bubble refractory (e.g. bubble aluminia), whereby the bubble refractory can be cast, whereby a positive connection between a cooling medium (e.g. a pipe coil with cooling water) and the inner lining can be achieved. For the hotter areas (temperatures>1500° C.) of the reactor, it can also be provided that the bubble refractory consists of spinel corundum or aluminum corundum. Alternatively, it may be provided that the outer lining consists of free-flowing cast masses with higher stability, but due to this, less insulating properties.

For the less hot areas (temperatures<1500° C.), the outer lining may be made of a cast insulating bubble refractory with a thermal conductivity of <1 W/mK in order to reduce heat loss. This design ensures that slag fur formation is favored by the more thermally conductive material in the hotter areas and heat loss is reduced by the less conductive material in the less hot areas. This is particularly advantageous as the less hot areas cover a much larger area of the reactor than the hotter areas.

Another advantageous embodiment of the invention is that the circumferential water-cooled console is made of black steel or stainless steel.

Whether black steel or stainless steel is used depends on the use and operation of the reactor. Black steel is cheaper and has a higher thermal conductivity than stainless steel. However, stainless steel is thermally and chemically more stable than black steel. Finite element thermal simulation can help determine which material should be used for the intended application.

An embodiment of the invention provides, that the tuyeres (of the upper and conical lower oxidation zone) are made of copper or steel. In addition, it may be provided that one of the tuyeres has a ceramic inner pipe, or each of some of the tuyeres has a respective ceramic inner pipe, or each of the tuyeres has a respective ceramic inner pipe. This embodiment of the tuyeres (with a ceramic inner pipe) enables the tuyere to be protected against melting of the metal by adding oxygen and/or air, whereby oxygen and/or air can also be preheated (e.g. to temperatures>1000° C.). It can also be advantageous that a compressible and temperature-resistant layer is arranged between the ceramic inner pipe and the tuyere, whereby thermally induced mechanical stresses can be compensated. This compressible and temperature-resistant layer consists, for example, of high-temperature felt, high-temperature cardboard or high-temperature foam.

An alternative embodiment of the invention provides that, the tuyeres (of the upper and conical lower oxidation zones) may be completely made of ceramic. Through this embodiment it can be achieved, for example, that the oxidation zone can be operated with a supply of hot air and/or oxygen having temperature more than 1000° C. and thus a bed temperature of more than 2000° C., since ceramics can withstand higher temperatures than metals.

The inevitably necessary cooling of metallic tuyeres is not necessary for tuyeres made entirely of ceramics, whereby the heat loss can be reduced by more than 5%. The chemical load caused by melting without cooling and the high thermal stress can be achieved for these tuyeres by a combination of ceramics with good thermal conductivity (e.g. silicon carbide with e.g. 85 W/mK) and slag freezing, followed by insulating ceramics (e.g. spinel corundum with less than 4 W/mK).

It can also be advantageous for the reactor that the cone angle (a) of the lined upper oxidation zone is between 5° and 30°.

This conical shape of the upper oxidation zone allows it to be advantageously achieved that a part of the slag remains on the surface of the lining, whereby the formation of a slag fur in this area is achieved.

For a further embodiment of the reactor it is intended that the lined upper reduction zone is arranged above the gas outlet section, wherein the gas outlet section adjoins the lower part of the lined upper reduction zone by creating a cross-sectional enlargement. Here it could be conceived, that the cross-sectional enlargement is abrupt.

Preferably, the cross-sectional area of the gas outlet section increases by at least twice that of the cross-sectional area of the upper reduction zone.

This embodiment ensures that the bed widens conically thereby increasing the surface area or discharge area of the bed. The surface or discharge area of the bed essentially corresponds to the outer surface for a truncated cone-shaped design.

An embodiment provides that the cross-sectional enlargement is such that the discharge area of the bed is at least 3 times larger than the cross-sectional area of the upper reduction zone. Furthermore, the cross-sectional enlargement can be so large that the discharge area of the bed is at least 7 times or even at least 9 times larger than the cross-sectional area of the upper reduction zone.

For this or a further embodiment, it may also be provided that the cross-sectional enlargement of the gas outlet section is such that the discharge area of the bed is increased by at least 5 times the cross-sectional area of the upper oxidation zone. Furthermore, the cross-sectional enlargement can be so large that the discharge area of the bed is at least 9 times larger than the cross-sectional area of the upper oxidation zone.

The advantage of the above-mentioned embodiments is that the gas flow velocity (through the gas outlet) is reduced proportionally to the increased discharge area of the bed (compared to known reactors)—so that the dust entrainment from the bed can be reduced to minimized.

Alternatively, it may be provided for the reactor that at least a portion of the lined upper reduction zone arranged in the co-current section is arranged or inserted in the gas outlet section.

This embodiment may also provide for the gas outlet section to have a larger cross-section than the upper reduction zone.

With this embodiment, the co-current section with a part of the upper reduction zone is introduced or partially inserted into the gas outlet section. For example, the lining (e.g. brick lining or castable lining) of the upper reduction zone protrudes into the gas outlet section. Since the gas outlet section has a larger cross-sectional area than the upper reduction zone and the at least one gas outlet is located in the edge portion of the gas outlet section, the gas produced in the co-current section must bypass the lining (e.g. brick lining or castable lining) extending out into the gas outlet section in order to reach the gas outlet, whereby less dust enters the dust separation. This embodiment allows the overall height of the reactor to be reduced, wherein at the same time the dust separation can be improved, since the gas and the entrained dust must additionally flow upwards in order to achieve at least one gas outlet.

It may also be provided that the lining (e.g. brick lining or castable lining) of the upper reduction zone extending out into the gas outlet section is formed as a hollow cylindrical shape. The hollow cylindrical shape may be made as a steel holder construction, which is lined on both sides which is protected by water cooling against high thermal and consequently mechanical stresses.

For a further embodiment of the invention, it is provided that the volume ratio of the upper oxidation zone volume to the plenum zone volume is a ratio of 1:N volume units, wherein N is a number greater than or equal to ($\geq$) 4 and less than or equal to ($\leq$) 20.

Thus, the upper oxidation zone volume is many times larger compared to previously known reactors, whereby a considerably higher capacity can be achieved. Here it is further conceivable that 5 is $\leq N \leq 15$ or even $6 \leq N \leq 11$.

In a reactor embodiment, it is provided that the volume ratio of the upper oxidation zone volume to the total volume of the upper reduction zone volume and the plenum zone volume is a ratio of 1:N volume units, wherein N is a number greater than or equal to ($\geq$) 7 and less than or equal to ($\leq$) 25.

A further embodiment provides that the volume ratio of the upper oxidation zone volume to the total volume of the upper reduction zone volume and the plenum zone volume is a ratio of 1:N volume units, wherein $8 \leq N \leq 15$ or even $9 \leq N \leq 14$.

This embodiment of the reactor is advantageous in that a larger capacity is achieved with a fictitious same height of the reactor. This is possible because the plenum zone volume compared to the oxidation volume has a smaller ratio than in known reactors.

A further embodiment of the reactor provides that the volume ratio of the countercurrent section volume to the total volume of the reactor is a ratio of 1:N volume units, where N is a number between 1 and 10 ($1 \leq N \leq 10$). Here it is further conceivable that $2 \leq N \leq 7$ or even $3 \leq N \leq 5$.

Due to the cross-sectional enlargement of the gas outlet zone and the countercurrent section, the discharge cone area in the conical lower reduction zone is also enlarged, whereby smaller gas flow velocities flow out of the bed and less dust is entrained.

Another advantageous embodiment of the reactor is that the cone angle of the conical lower reduction zone and the cone angle of the conical lower oxidation zone are between 50° and 70°. Due to this embodiment, the slag, which is kept liquid at sufficiently high temperatures in the conical lower oxidation zone and the conical lower reduction zone, drains off better, since the walls run at an angle of approx. 50°-70°, preferably approx. 60° C., from the horizontal or at an angle of 20° to 40° from the vertical.

A further embodiment of the reactor provides that gas supply means are arranged in the area of the cross-sectional enlargement in the pyrolysis zone. This embodiment ensures that hot gases (e.g. preheated air or combustion gases) are supplied to the discharge cone.

In one embodiment of the invention, it is also provided that the tuyeres of the upper oxidation zone are arranged on several levels (heights). This is particularly advantageous because a better distribution of the gas is achieved with uniform heating of the bed. In addition, this embodiment ensures that local overheating of the lining (e.g. brick lining or castable lining) is avoided as far as possible.

Another advantageous embodiment of the reactor is that at least one tuyere is arranged on a level (height) of the conical lower reduction zone.

The further tuyere additionally supplies air and/or oxygen in a defined way, so that no $CO_2$ is produced, but almost exclusively CO. Furthermore, it can be achieved through this embodiment that the throughput can be increased. Furthermore, this embodiment enables a throughput increase and an increase in a gas outlet temperature at the gas outlet above 1500° C. without impairing the quality of the gas.

For applications that prefer thermal energy over chemical energy it may be further advantageous that at least one additional tuyere is arranged in the upper reduction zone. Through this embodiment it can be advantageously achieved that chemical energy (CO, $H_2$) is turned back to thermal energy by oxidizing the CO to $CO_2$ and $H_2$ to $H_2O$.

A further embodiment provides that at least one other tuyere is arranged on a further level (height) of the conical lower oxidation zone. The tuyere at the next level is located preferably above the tapping.

By arranging the tuyere above the tapping, the melting can be facilitated in the area of the tapping, as the heat is generated in the area where the melt is to run off liquid. At the same time, the arrangement of the tuyere above the tapping ensures that the solidified melt desired on the opposite side of the tapping (so-called slag freezing, which protects the lining as, e.g. brick lining) is not liquefied and therefore does not flow off.

According to a third aspect of the present invention, there is provided for the use of the reactor according to the second aspect of the present invention for providing gases having temperatures between 1500° C. and 1750° C. and a $CO/CO_2$ ratio$\geq 15$, wherein the gases are introduced into a metallurgical reactor for reduction melting. The gases preferably have a temperature of between 1600° C. and 1750° C. Furthermore, it is provided that the gases may be introduced into a metallurgical reactor for reduction melting. The $CO/CO_2$ gas volume ratio of the gases introduced into the metallurgical reactor for reduction melting may be greater than 10 or even greater than 15. For example, the $CO/CO_2$ gas volume ratio is between 10 and 1000, preferably between 15 and 10000 and in particular preferably between 15 and $10^7$ (essentially $CO_2$-free).

According to a fourth aspect of the present invention, there is provided for a system comprising a reactor according to the second aspect of the present invention and a metallurgical reactor connected to the reactor for reduction melting. It is conceivable here that the reactor is operated with the process described above, so that the $CO/CO_2$ gas volume ratio in the region (connecting section) between the reactor and the metallurgical reactor for reduction melting is greater than 10 or even greater than 15. For example, the $CO/CO_2$ gas volume ratio is between 10 and 1000, preferably between 15 and 10000 and in particular preferably between 15 and $10^7$ (essentially $CO_2$-free).

The metallurgical reactor for reduction melting may be any reactor or blast furnace capable of reducing metals from ores.

According to a fifth aspect of the present invention, there is provided for the use of the reactor according to the second aspect of the present invention to provide a hot gas for a process for the smelting of a metalliferous feedstock material. The process for the smelting of a metalliferous feedstock material may be the process described in Dutch priority founding patent application number 2023109 entitled "Process for the smelting of a metalliferous feedstock material" in the name of African Rainbow Minerals Limited.

According to a sixth aspect of the present invention, there is provided for the use of the reactor according to the second aspect of the present invention in the method according to the first aspect of the present invention.

Further advantages, details and developments result from the following description of the invention, with reference to the attached drawings.

DETAILED DESCRIPTION OF THE DRAWINGS

Like-numbered elements in these figures are either identical or fulfill the same function. Elements previously discussed are not necessarily discussed in later figures if the function is equivalent.

In the following, FIG. 1 describes a substantially cylindrical reactor 100 according with the invention. In connection with the explanation of the details of the reactor, the method steps that take place during the treatment of feed materials and the generation of gas temperatures above 1500° C. at a gas outlet are also specified.

By using other feed materials, modifications of the reactor and/or method may be useful. In general, different feed materials (for instance low-grade coal) can also be combined, for example by adding feed materials with a higher energy value (e.g. organic waste, contaminated waste wood, car tires or the like) during the gasifying/melting of non-organic feed materials.

Figure 1:
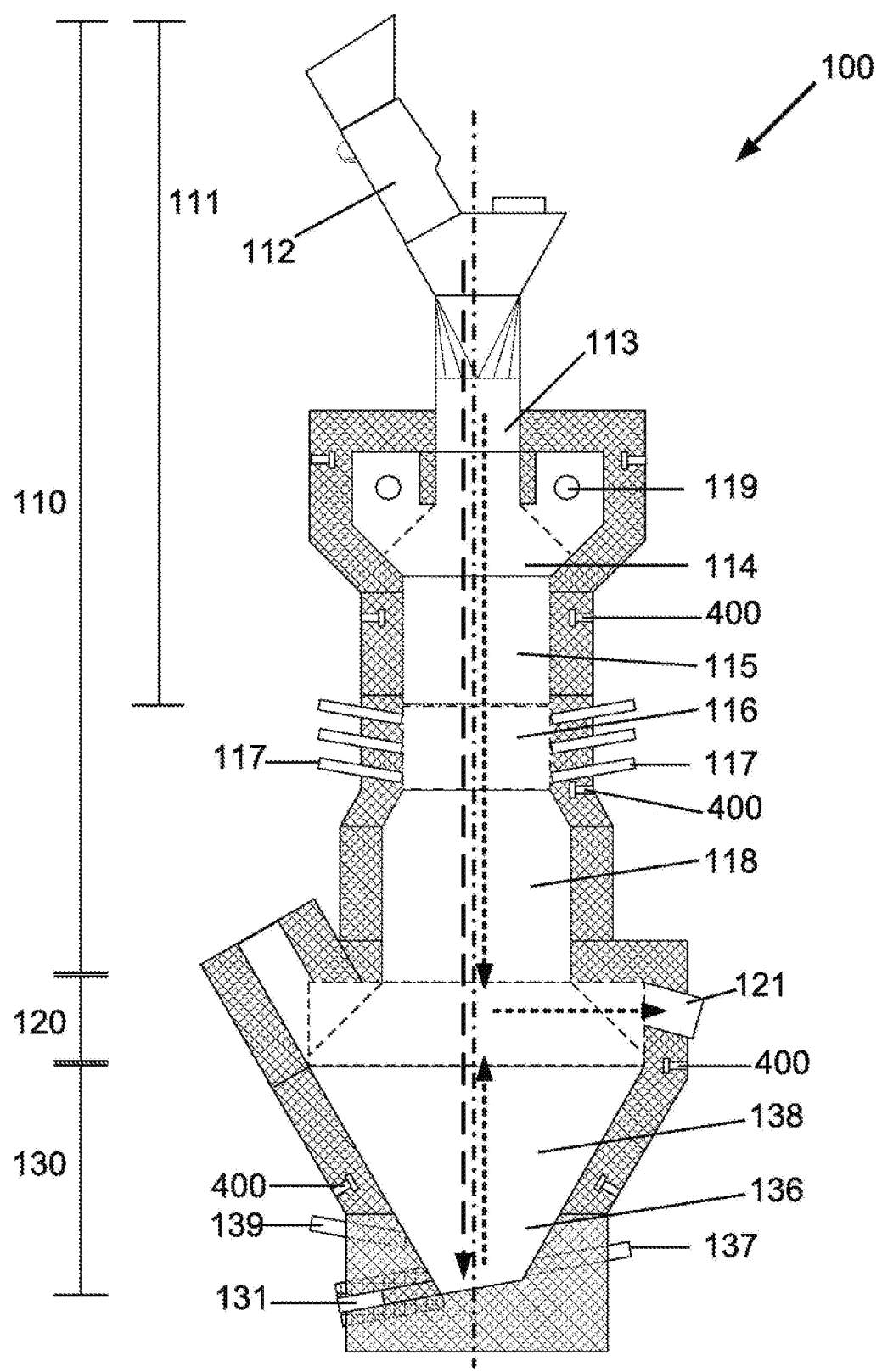
FIG. 1 shows a simplified cross-sectional view of a reactor according to the invention.

The reactor 100 shown in FIG. 1 has three sections. A partially lined co-current section 110, a refractory lined gas outlet section 120 and a refractory lined countercurrent section 130. The co-current section 110, the gas outlet section 120 and the countercurrent section 130 are arranged substantially concentrically to each other (represented by the vertical dash-dot line passing substantially through the center of the reactor). As shown, several circumferential water-cooled consoles 400 are shown in the co-current section 110 and in the counter-current section 130. The circumferential water-cooled consoles 400 are arranged between at least two refractory lining sections arranged one above the other (not shown) in the area of the tongue-and-groove connections (not shown). In the co-current section a non-lined plenum zone 111, a refractory lined upper oxidation zone 116 and a refractory lined upper reduction zone 118 are arranged. The plenum zone 111 comprises a feed zone with a sluice 112, whereby feed materials such as waste, water, car tires, additives or other feed materials are fed into the reactor from above via the feed zone. The material flow of the solids is shown as a dashed arrow from top to bottom. A downstream buffer zone is arranged below the pyrolysis zone 114 for buffering and pre-drying the feed material volume, which adjoins the bottom of the buffer zone thereby creating a cross-sectional enlargement. In the pyrolysis zone 114, a discharge cone can form from feed materials (represented by the oblique dashed lines; between 114 and 119). Pyrolysis can therefore take place on the surface of the bed. The pyrolysis zone can also be made inert with combustion gas or any other low oxygen gas (e.g. $N_2$ or $CO_2$), therefore flammable gases moving to the sluice 112 burn safely. Below the pyrolysis zone 114 there is a lined intermediate zone 115 which is equipped for final drying and complete pyrolysis. A refractory lined upper oxidation zone 116 adjoins the refractory lined intermediate zone 115, wherein in the upper oxidation zone 116 tuyeres are arranged circumferentially in a plurality of planes as shown. At least 1000° C. hot oxygen and/or air is supplied via the tuyere 117, which increases the temperature above 1800° C. and up to 4000° C. such that all substances are converted into inorganic gas, liquid metal, coke, carbon and/or mineral slag. In the refractory lined upper reduction zone 118, which adjoins the lined upper oxidation zone 116 and which is arranged substantially above a subsequent lined gas outlet section 120, the endothermic conversion of thermal energy into chemical energy takes place. At the same time, the gas co-current (represented by a dotted arrow running from top to bottom), which is generated from the plenum zone to the upper refractory lined reduction zone 118 from top to bottom, is generated here and introduced into the refractory lined gas outlet section 120.

As shown, the refractory lined gas outlet section 120 is connected to the refractory lined upper reduction zone 118, thereby creating a cross-sectional enlargement. The gas produced is—approximately in cross-flow to the bed—discharged in the gas outlet section 120 through at least one gas outlet 121 (shown by a dotted arrow running from left to right). It may be provided, for example, that four or more gas outlets 121 are radially distributed around the circumference (not shown), so that the gas produced in the co-current section and in the countercurrent section can be diverted radially in the cross-flow. The discharged gas has a $CO/CO_2$ gas volume ratio between 10 and 1000, preferably between 15 and 10000 and particularly preferably between 15 and $10^7$ (essentially $CO_2$-free).

Below the gas outlet section is the refractory lined conical lower reduction zone 138. In the refractory lined conical lower reduction zone 138 the conversion of thermal energy into chemical energy also takes place.

Below the lined conical lower reduction zone there is, as shown, a lined conical lower oxidation zone 136 in which at least one tuyere 137 and a tapping 131 are arranged. The tuyere 137 introduces at least 1000° C. hot air and/or oxygen to oxidize the remaining coked material and prevents the melt from solidifying. The collection and discharge of metal melts and slag melts takes place in the tapping 131.

The gas generated in the conical lower oxidation zone and in the conical lower reduction zone also flows in counter-current with the solid's flow through the bed (represented by a dotted arrow running from bottom to top) to the refractory lined gas outlet section 120, where it is discharged via at least one gas outlet 121.

The reactor according to the invention can have the following internal volumes, for example:

TABLE 1

| Reactor | Example 1 [m³] | Example 2 [m³] |
| --- | --- | --- |
| Co-current section: | 19.80 | 118.70 |
| Feed zone with sluice | 2.70 | 3.20 |
| Buffer zone | 4.00 | 6.00 |
| Pyrolysis zone | 4.70 | 41.60 |
| Intermediate zone | 4.00 | 20.40 |
| Upper oxidation zone | 1.50 | 9.90 |
| Upper reduction zone | 2.80 | 37.70 |
| Gas outlet section: | 3.20 | 32.20 |
| Countercurrent section: | 6.80 | 59.50 |

Figure 2:
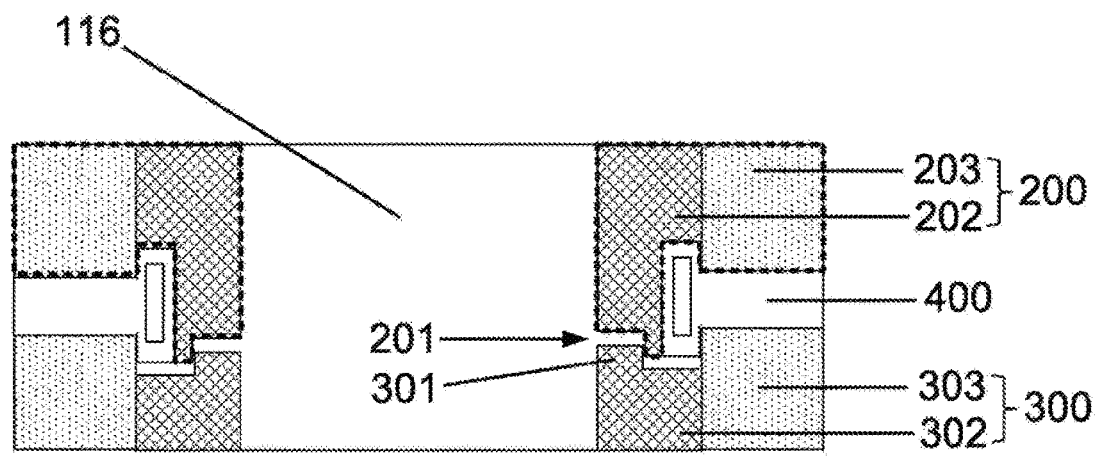
FIG. 2 shows a cut-out of a simplified cross-sectional view of the reactor according to the invention with two lining sections and tongue-and-groove connections.

FIG. 2 shows a cut-out of a simplified cross-sectional view of the refractory lined intermediate zone 115 of the reactor according to the invention with two lined sections 200, 300 and a circumferential tongue-and-groove connection. As shown as an example for the lined intermediate zone 115, where each other lined portion can also have at least two lined sections 200, 300 with circumferential tongue-and-groove connection, this lined portion of the reactor has at least two lined sections 200, 300 arranged one above the other. Each of the at least two lined sections 200, 300 comprises at least one inner refractory liner 202, 302 and an outer liner 203, 303 enclosing the inner refractory liner. It is conceivable that the inner refractory liner 202, 302 is a liner made of fired bricks or a monolithic (e.g. cast) liner. As shown further in FIG. 2, a tongue-and-groove connection is formed between the lining sections 200, 300 arranged one above the other, one of the lining sections 200 has a groove 201 on the side facing the reactor interior and the other lining section 300 has a tongue 301 on the side facing the reactor interior. As shown here, it can be provided that the upper lining section 200 has the groove 201 and the lower lining section 300 has the tongue 301. Furthermore, the tongue-and-groove connection has a (vertical) temperature-dependent gap opening 400 between the groove 201 and the tongue 301. As further shown, a circumferential water-cooled console 400 is arranged between the at least two lining sections 200, 300 arranged one above the other.

Figure 3:
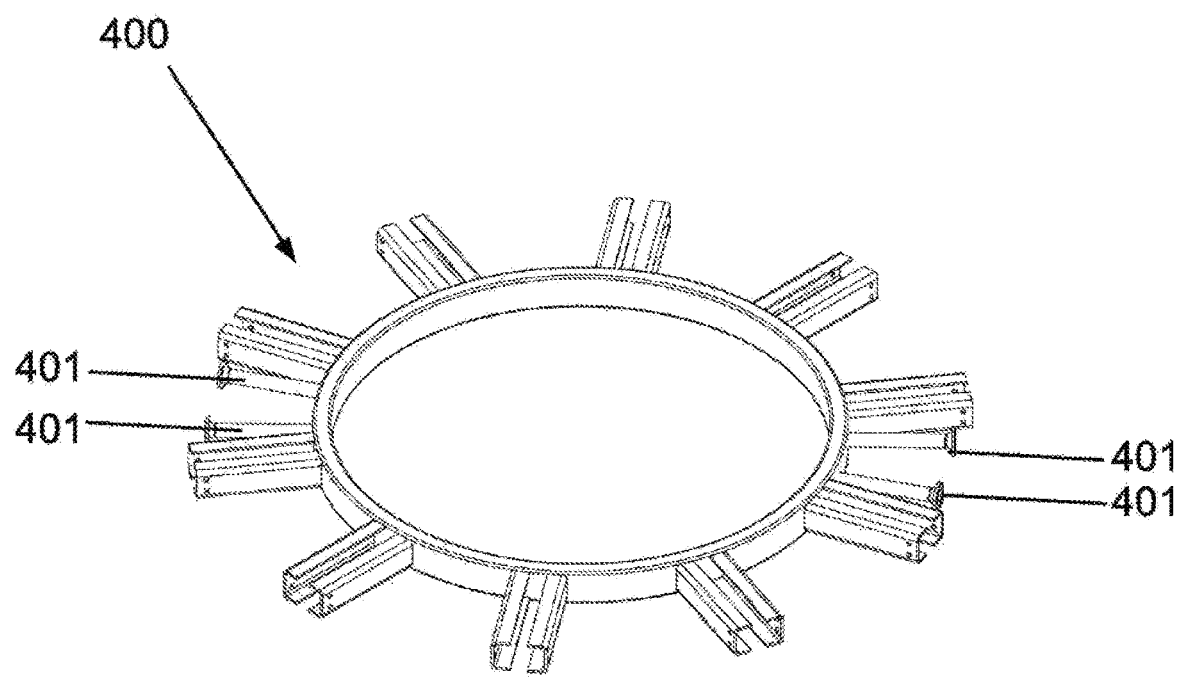
FIG. 3 shows a perspective view of the circumferential water-cooled console, which can be placed between two lining sections and in the area of the tongue-and-groove connection.

The circumferential water-cooled console 400 for holding the brick lining and stabilizing the brick lining during high heating and cooling of the reactor is shown in perspective view in FIG. 3. This circumferential water-cooled console 400 is manufactured by bending, without welding seams, of hollow cylindrical pipes with square or rectangular cross-sections and is made of black steel. Cooling water can be supplied to and drained from the water-cooled console 400 by means of the connection flanges 401 as shown.

The invention claimed is:

1. A method of gasifying a carbonaceous feedstock material to generate hot reducing gases using a reactor, the method including the steps of:
choke-feeding a carbonaceous feedstock material via a sluice to form a discharge bed in a pyrolysis zone of the reactor;
heating the discharge bed in the pyrolysis zone to initiate pyrolysis in the carbonaceous feedstock material and to form a pyrolysis product;
providing a lower lying hot upper oxidation zone in the reactor by supplying a source of oxygen at a temperature of at least 800° C. to the reactor at a location beneath the pyrolysis zone;
gasifying the pyrolysis product and remaining un-pyrolyzed carbonaceous feedstock material in the hot upper oxidation zone to form a char bed in an upper reduction zone of the reactor, the upper reduction zone being located beneath the hot upper oxidation zone;
converting thermal energy into chemical energy in the upper reduction zone;
providing a lower lying hot lower oxidation zone in the reactor by supplying a source of oxygen at a temperature of at least 800° C. to the reactor at a location beneath a lower reduction zone of the reactor;
collecting any metal and/or slag melts present in the lower oxidation zone;
removing the metal and/or slag melts present in the lower oxidation zone; and
discharging hot reducing gases having a temperature of at least 1300° C. and a $CO/CO_2$ ratio of $\geq 5$ which have been generated in the upper reduction zone through a gas outlet located in a gas outlet section of the reactor, the gas outlet section being located between the upper reduction zone and the lower reduction zone of the reactor.

2. The method of claim 1, wherein the hot reducing gases which are being discharged have a $CO/CO_2$ ratio of $\geq 15$.

3. The method of claim 1, wherein the heating of the discharge bed in the pyrolysis zone is done gradually to a temperature of at least 700° C., the temperature being increased gradually to prevent breakup of the carbonaceous feedstock material and pyrolysis product.

4. The method of claim 1, including the step of providing hot gases to the pyrolysis zone to heat the discharge bed in the pyrolysis zone to initiate pyrolysis in the carbonaceous feedstock material and to form the pyrolysis product.

5. The method of claim 4, including the step of controlling the volumetric flow rate of the hot gases which are being fed to the pyrolysis zone so as to heat the discharge bed in the pyrolysis zone gradually to a temperature of at least 700° C., the temperature being increased gradually to prevent breakup of the carbonaceous feedstock material and pyrolysis product.

6. The method of claim 1, including the step of drying the carbonaceous feedstock material prior to choke-feeding the carbonaceous feedstock material to the reactor.

7. The method of claim 1, including the step of preheating and pre-drying the carbonaceous feedstock material in a buffer zone of the reactor, the buffer zone being located above the pyrolysis zone of the reactor.

8. The method of claim 7, wherein by feeding the carbonaceous feedstock material in the pyrolysis zone, a discharge bed having a discharge cone is formed, the cross-section of the pyrolysis zone being enlarged with respect to the cross-section of the buffer zone.

9. The method of claim 1, including the step of pyrolyzing and drying the carbonaceous feedstock material in an intermediate zone of the reactor, the intermediate zone being located beneath the pyrolysis zone.

10. The method of claim 9, including the step of discharging hot reducing gases having a temperature of at least 1300° C. which have been generated in a co-current section of the reactor from the at least one gas outlet of the reactor, the co-current section comprising:
a plenum zone of the reactor, the plenum zone comprising:
the feed zone of the reactor;
the buffer zone of the reactor;
the pyrolysis zone of the reactor; and
the intermediate zone of the reactor;
the upper oxidation zone of the reactor; and
the upper reduction zone of the reactor.

11. The method of claim 1, wherein the method includes the step of discharging hot reducing gases having a temperature of at least 1300° C. which have been generated in a countercurrent section of the reactor through the gas outlet located in the gas outlet section of the reactor, the countercurrent section comprising the lower oxidation zone and lower reduction zone of the reactor.

* * * * *